US012633770B2

(12) United States Patent
Zhou et al.

(10) Patent No.: US 12,633,770 B2
(45) Date of Patent: May 19, 2026

(54) METHOD AND SYSTEM FOR PREDICTING ELECTRICAL STATE QUANTITY OF UNINTERRUPTIBLE POWER SUPPLY (UPS) SYSTEM, AND UPS SYSTEM CONTROL METHOD AND UPS SYSTEM

(71) Applicant: GUANGDONG ZHICHENG CHAMPION GROUP CO., LTD., Dongguan (CN)

(72) Inventors: Xiaoping Zhou, Dongguan (CN); Lingfeng Deng, Dongguan (CN); Lerong Hong, Dongguan (CN); Yifeng Liu, Dongguan (CN); Haitao Xia, Dongguan (CN); Renlong Zhu, Dongguan (CN); Yu Chen, Dongguan (CN); Yandong Chen, Dongguan (CN); An Luo, Dongguan (CN)

(73) Assignee: Guangdong Zhicheng Champion Group Co., Ltd., Dongguan (CN)

( * ) Notice: Subject to any disclaimer, the term of this patent is extended or adjusted under 35 U.S.C. 154(b) by 36 days.

(21) Appl. No.: 18/268,040

(22) PCT Filed: Jun. 17, 2022

(86) PCT No.: PCT/CN2022/099325
§ 371 (c)(1),
(2) Date: Jun. 16, 2023

(87) PCT Pub. No.: WO2023/098027
PCT Pub. Date: Jun. 8, 2023

(65) Prior Publication Data
US 2024/0053813 A1      Feb. 15, 2024

(30) Foreign Application Priority Data

Nov. 30, 2021    (CN) .......................... 202111441452.X

(51) Int. Cl.
*H02J 9/06* (2006.01)

(52) U.S. Cl.
CPC ........... *H02J 9/062* (2013.01); *H02J 2203/20* (2020.01)

(58) Field of Classification Search
CPC ......... H02J 9/062; H02J 2203/20; H02J 9/06; G06Q 10/04; G06Q 50/06; G06F 17/15
See application file for complete search history.

(56) References Cited

FOREIGN PATENT DOCUMENTS

| CN | 102738885 A | 10/2012 |
| CN | 104753140 A | 7/2015 |

(Continued)

OTHER PUBLICATIONS

English abstract of CN102738885A.

(Continued)

*Primary Examiner* — Hung Q Nguyen
(74) *Attorney, Agent, or Firm* — Caesar Rivise, PC

(57) ABSTRACT

The present invention discloses an electrical state quantity prediction method and system and a control method and system for a UPS system. In terms of UPS system control strategies, relationships between predicted values of dynamic variables of the UPS system and switch variables of switch tubes are first obtained through a discrete model of the UPS system, then a target optimization control function is constructed based on MPC (Model Predictive Control), and finally, optimal switch variables at each time are obtained by traversing cost values Q of the target optimization control function in various switch states. The method of the present invention solves problems of complex cooperative control, difficult control optimization and the like in a multi-converter system, and improves work efficiency of a high-power UPS system and stability of the control system.

10 Claims, 12 Drawing Sheets

(56)            References Cited

FOREIGN PATENT DOCUMENTS

| CN | 106059361 | A | 10/2016 | |
|----|-----------|---|---------|---|
| CN | 112186791 | A | 1/2021 | |
| CN | 112787529 | A | 5/2021 | |
| CN | 114372605 | A | 4/2022 | |
| KR | 101399120 | B1 * | 5/2014 | .............. H02J 9/062 |
| WO | WO2021/069259 | A1 | 4/2021 | |

OTHER PUBLICATIONS

English abstract of CN104753140A.
English abstract of CN114372605A.
English abstract of CN106059361A.
English abstract of CN112787529A.
English abstract of CN112186791A.
International Search Report from corresponding PCT Application No. PCT/CN2022/099325 dated Sep. 14, 2022.
Tang, et al., "FCS-MPC Strategy for NPC Three-Level Fault-Tolerant PV Grid-Connected Inverters Based on SAADR-PI Control", High Voltage Engineering, vol. 46, No. 10, p. 3546 (2020).

* cited by examiner

METHOD AND SYSTEM FOR PREDICTING ELECTRICAL STATE QUANTITY OF UNINTERRUPTIBLE POWER SUPPLY (UPS) SYSTEM, AND UPS SYSTEM CONTROL METHOD AND UPS SYSTEM

CROSS REFERENCE TO RELATED APPLICATIONS

The present application is a U.S. national phase application which claims the benefit under 35 U.S.C. § 371 of PCT Application No. PCT/CN2022/099325, filed on Jun. 17, 2022, which in turn claims rights and interests to Chinese Patent Application No. 202111441452.X filed on Nov. 30, 2021, and all of which are incorporated by reference herein.

FIELD OF THE INVENTION

The present invention relates to the technical field of UPS control, in particular to an electrical state quantity prediction method and system and a control method and system for a UPS system.

BACKGROUND OF THE INVENTION

As shown in FIG. 1, a topology of a high-power UPS (uninterruptible power supply) system is a common direct current bus structure of a T-type three-level rectifier, a T-type three-level inverter, and a three-level three-phase direct current converter, with two voltage stabilization capacitors $C_1$ and $C_2$ on a direct current bus, and an electromagnetic bypass switch composed of a thyristor. The T-type three-level rectifier is connected to an alternating current grid, and two direct current buses are led out from a direct current side capacitor. The T-type three-level inverter is connected to a load, the three-level bidirectional direct current converter is connected to an energy storage battery, and the battery is connected to the direct current bus through the three-level bidirectional direct current converter. The T-type three-level inverter inverts power from the direct current bus into alternating current, which is then supplied to the load. The electromagnetic bypass switch is connected between a mains supply and the load. The UPS system has a total of four working modes: a bypass working mode, a UPS power supply mode, a battery power supply mode, and a battery feed mode.

FIG. 2 is a working mode diagram of a high-power UPS. The high-power UPS has a total of four working modes: a bypass working mode, a UPS power supply mode, a battery power supply mode, and a battery feed mode.

Bypass working mode: the UPS fails or a bypass switch is manually enabled, a grid directly supplies power to a load, and the UPS is latched.

UPS power supply mode: when both the mains supply and the UPS are normal, the bypass switch is turned off, a T-type three-level rectifier works in a PWM rectifier state, a T-type three-level inverter works in a PWM inverter state, the grid supplies power to the load through the rectifier and the inverter, and a three-level bidirectional direct current converter obtains power from a direct current bus to charge a battery.

Battery power supply mode: when the mains supply is abnormal and the UPS is normal, the electromagnetic bypass switch is turned off, the T-type three-level rectifier module is latched, and the battery may directly supply power to the load through the bidirectional direct current converter and the T-type three-level inverter module, so as to ensure continuity of power supply.

Battery feed mode: when both the mains supply and the UPS are normal, the load does not require power supply, and an SOC (State of Charge) of the battery is >0.8, the electromagnetic bypass switch is turned off, the T-type three-level inverter module is latched, and the battery feeds electric energy back to the grid through the bidirectional direct current converter and the T-type three-level rectifier (working in an inversion mode). In recent years, the UPS has been developing towards large scales and modularization, and system integration and central monitoring have also been continuously improved. However, with continuous expansion of the market, use of the UPS is also increasing, loads are increasingly complex, and the uninterruptible power supply needs to adapt to increasingly harsh conditions, which put forward many adjustment requirements for the UPS. How to achieve high-power applications of the UPS and improve operating efficiency and control stability of UPS systems is an important research topic in current development of UPS technology and industry.

SUMMARY OF THE INVENTION

The technical problem to be solved by the present invention is to provide an electrical state quantity prediction method and system and a control method and system for a UPS system in response to the shortcomings of the prior art, to solve problems of complex multi-converter control and low reliability in existing UPS systems.

To solve the above technical problem, the technical solution adopted by the present invention is:

An electrical state quantity prediction method for a UPS system includes:

a calculation formula for a predicted value $i_g(k+1)$ of alternating current output by a T-type three-level rectifier of the UPS system is:

$$i_g(k+1) = (1 - \frac{R_s T_s}{L_s})i_g(k) + \frac{T_s}{L_s}[u(k) - u_g(k)];$$

a calculation formula for a reference value $u_{r\_ref}(k)$ of alternating current voltage output by the T-type three-level rectifier of the UPS system is:

$$u_{r\_ref}(k) = \frac{L_s}{T_s}i_{rg\_ref}(k) + (R_s - \frac{L_s}{T_s})i_g(k) + u_g(k);$$

a calculation formula for a reference value $u_{i\_ref}(k)$ of alternating current voltage output by a T-type three-level inverter of the UPS system is:

$$u_{i\_ref}(k) = u_n(k);$$

a calculation formula for a predicted value $u(k+1)$ of alternating current voltage of the UPS system is:

$$u(k+1) = u(k)e^{j\omega T_s};$$

a calculation formula for a predicted value $U_{cn}(k+1)$ of direct current side voltage stabilization capacitor of the UPS system is:

$$U_{cn}(k+1) = U_{cn}(k) + \frac{T_s}{C_n}i_{Cn}(k);$$

a calculation formula for a predicted value $i_L(k+1)$ of inductance current of a three-level three-phase direct current converter of the UPS system is:

$$i_L(k+1) = \frac{T_s}{L}[U_{ES} - (T_1 \| T_3)U_{C1}(k) - (T_2 \| T_4)U_{C2}(k)] + i_L(k);$$

where $u(k)$ is alternating current voltage output by the T-type three-level rectifier, $L_s$ is a value of filter inductance output by the T-type three-level rectifier, $T_s$ is sampling interval time, $R_S$ is resistance of an output line of the UPS system, $i_g(k)$ is grid side current at sampling time k, and $u_g(k)$ is grid voltage at the sampling time k; $u_{r\_ref}(k)$ is instruction voltage output by an alternating current side of the T-type three-level rectifier at the sampling time k, and $i_{rg\_ref}(k)$ is an instruction value of grid side current at the sampling time k; $u_n(k)$ is a sampling value of rated load voltage at the sampling time k; $\omega$ is an angular frequency of a grid; $U_{cn}(k+1)$ is a voltage value of a direct current side capacitor $C_n$ of the T-type three-level rectifier at sampling time k+1, $U_{cn}(k)$ is a voltage value of $C_n$ at the sampling time k, and $i_{cn}(k)$ is a value of current flowing through $C_n$ at the sampling time k; $U_{ES}$ is voltage of an energy storage battery, L is an inductance value of the three-level three-phase direct current converter of the UPS system, $T_1$-$T_4$ are output states of a switch tube of the three-level three-phase direct current converter, and $i_L(k)$ is an inductance current value of the three-level bidirectional direct current converter at the time k; n=1, 2; and $\|$ represents a logical OR operation.

The present invention may predict an electrical state corresponding to each switch quantity, and facilitates overall optimization and control of the UPS system in a control process of the UPS system, thereby solving problems of complex multi-converter control and low reliability in existing UPS systems.

The present invention further provides an electrical state quantity prediction system for a UPS system. The prediction system includes a processor and a memory; the processor is used to execute a computer program stored in the memory; and the computer program is configured to execute the steps of the prediction method of the present invention.

The present invention further provides a control method for a UPS system, including: when the UPS system works in a UPS power supply mode, if a SOC of a battery ≥0.8, constructing an optimization function $Q=J_1+J_2$;

when the UPS system works in the UPS power supply mode, if the SOC of the battery <0.8, constructing an optimization function $Q=J_1+J_2+J_3$;

when the UPS system works in a battery power supply mode, or when the UPS system works in a battery feed mode, if the SOC of the battery >0.2, constructing an optimization function $Q=J_2+J_4$;

where, $$J_1|u_{r\alpha\_ref}(k+1)-u_{r\alpha}(k+1)|+|u_{r\beta\_ref}(k+1)-u_{r\beta}(k+1)|+ \\ \lambda_1|U_{c1}(k+1)-U_{c2}(k+1)|;$$

$$J_2=|u_{i\alpha\_ref}(k+1)-u_{i\alpha}(k+1)|+|u_{i\beta\_ref}(k+1)-u_{i\beta}(k+1)|;$$

$$J_3=|U_{dc\_ref}-U_{dc}(k+1)|+|i_{L\_ref}-i_L(k+1)|;$$

$$J_4=|U_{dc\_ref}-U_{dc}(k+1)|+|i_{L\_ref}-i_L(k+1)|+\lambda_2|U_{c1}(k+1)- \\ U_{c2}(k+1)|;$$

$u_{r\alpha}(k+1)$ is a projection of alternating current voltage $u_r(k+1)$ output by a T-type three-level rectifier on an α-axis at sampling time k+1, and $u_{r\alpha\_ref}(k+1)$ is a projection of a reference value $u_{r\_ref}(k+1)$ of the alternating current voltage output by the T-type three-level rectifier on the α-axis; $u_{r\beta}(k+1)$ is a projection of the alternating current voltage $u_r(k+1)$ output by the T-type three-level rectifier on a β-axis at the sampling time k+1, and $u_{r\beta\_ref}(k+1)$ is a projection of the reference value $u_{r\_ref}(k+1)$ of the alternating current voltage output by the T-type three-level rectifier on the β-axis at the sampling time k+1; $U_{c1}(k+1)$ and $U_{c2}(k+1)$ represent voltage values of direct current side capacitors $C_1$ and $C_2$ of the T-type three-level rectifier at the sampling time k+1 respectively, $u_{i\alpha}(k+1)$ is a projection of alternating current voltage $u_i(k+1)$ output by a T-type three-level inverter on the α-axis at the sampling time k+1, $u_{i\_ref}(k+1)$ is a projection of a reference value $u_{i\_ref}(k+1)$ of the alternating current voltage output by the T-type three-level inverter on the α-axis at the sampling time k+1, $u_{i\beta}(k+1)$ is a projection of the reference value $u_{i\_ref}(k+1)$ of the alternating current voltage output by the T-type three-level inverter on the β-axis at the sampling time k+1, $u_{i\beta\_ref}(k+1)$ is a projection of the reference value $u_{i\_ref}(k+1)$ of the alternating current voltage output by the T-type three-level inverter on the β-axis, $\lambda_1$ is a control weight of the T-type three-level rectifier, and $\lambda_2$ is a control weight of a three-level three-phase direct current converter; $i_{L\_ref}$ is an inductance current value of the T-type three-level three-phase direct current converter; $U_{dc\_ref}$ is an instruction value of direct current side voltage of the T-type three-level rectifier, and $U_{dc}(k+1)$ is a value of direct current side capacitor voltage at the time k+1; and selecting an output quantity of each switch tube when the optimization function is minimum (1 represents on of the switch tube, and 0 represents off of the switch tube), and controlling on-off of the switch tube of the T-type three-level rectifier, the switch tube of the T-type three-level inverter, and the switch tube of the three-level three-phase direct current converter according to the output quantity of the corresponding switch tube;

where $u_{r\_ref}(k+1)$ and $u_{i\_ref}(k+1)$ are calculated according to the prediction method in the present invention, or calculated by using the prediction system in the present invention;

where $u_{r\_ref}(k+1)$ and $u_{i\_ref}(k+1)$ are calculated according to the electrical state quantity prediction method for a UPS system in the present invention, or calculated by using the electrical state quantity prediction system for a UPS system in the present invention.

The control method for a UPS system in the present invention has significant advantages over traditional control methods (PI control, current tracking control, etc.) in multi-terminal converter systems. Because a control object of the traditional control methods is mostly a system, such as an energy storage output port in a UPS, an input port of a UPS rectifier, or an output port of a UPS inverter, optimal switching control of each port may have mutual restriction, making it difficult to achieve comprehensive optimization. The control method for a UPS system in the present invention predicts in advance an electrical state corresponding to each switch quantity, and uses a comprehensive optimization function to achieve overall optimal control of a multi-port system, so there is no mutual restriction in optimal switching control of each port.

The control method of optimizing a switch quantity by using an overall objective function may implement a coordinated optimization function for multiple ports, and find, through the optimization function Q, a switch combination that can quickly approach an instruction value, so compared with traditional PI control, the response speed of the present invention is faster and the reliability is higher.

In the present invention, $\lambda_1+\lambda_2=1$, and direct current side balances of the T-type three-level rectifier and the three-phase direct current converter may restrict each other during control, so direct current side capacitor balance control of the converter is determined according to a power margin, where an overall system balance factor is 1, and $\lambda_1$ and $\lambda_2$ are weights of respective controllers and are set according to margins of the controllers. The setting of $\lambda_1+\lambda_2=1$ in the present invention may overcome the problem of mutual restriction between the direct current side balances of the T-type three-level rectifier and the three-phase direct current converter during control.

As an inventive concept, the present invention further provides a control system for a UPS system. The control system includes a processor and a memory; the processor is used to execute a computer program stored in the memory; and the computer program is configured to execute the steps of the control method in the present invention.

Compared with the prior art, beneficial effects of the present invention are as follows: a target optimization control function is constructed through MPC (Model Predictive Control), and cost values Q of the target optimization control function in various switch states are traversed to obtain optimal switch variables at each time, thereby improving work efficiency and operational stability of the UPS system. The present invention solves problems of complex cooperative control, difficult control optimization, and the like in a multi-converter system, improves work efficiency of a high-power UPS system and stability of the control system, and enables the high-power UPS system to be more widely used in various industrial applications.

BRIEF DESCRIPTION OF THE DRAWINGS

FIG. 2(*b*) shows a UPS power supply mode; FIG. 2(*c*) shows a battery power supply mode; and FIG. 2(*d*) shows a battery feed mode;

in FIG. 3(*b*), Sa3=1, Sa4=1, and output n; and in FIG. 3(*c*), Sa2=1, Sa2=1, and output O;

FIG. 5(*b*) shows that the battery feeds electric energy to $C_1$; FIG. 5(*c*) shows that the battery feeds electric energy to an inductor L; FIG. 5(*d*) shows that the battery feeds electric energy to capacitors $C_1$ and $C_2$; FIG. 5(*e*) shows that $C_1$ charges the battery; FIG. 5(*f*) shows that $C_2$ charges the battery; FIG. 5(*g*) shows that the inductor L discharges the battery; and FIG. 5(*h*) shows that $C_1$ and $C_2$ charge the battery;

FIG. 7(*b*) is a system output power instruction diagram; FIG. 7(*c*) is a current waveform diagram during mode switching; and FIG. 7(*d*) is a voltage waveform diagram of the system during mode switching.

DETAILED DESCRIPTION OF THE EMBODIMENTS

Figure 1:
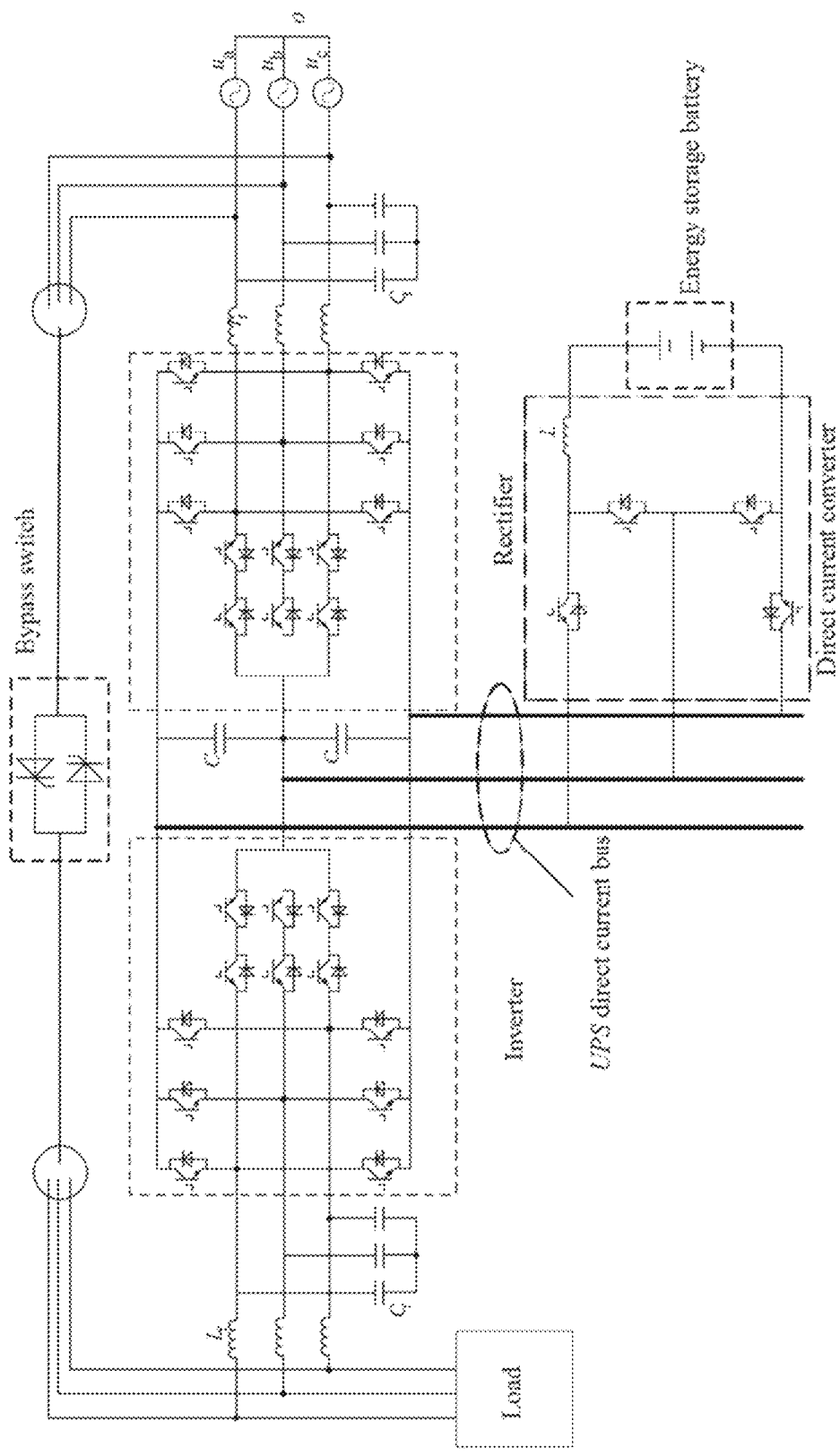
FIG. 1 is an overall structural diagram of a high-power UPS.
Figure 2A:
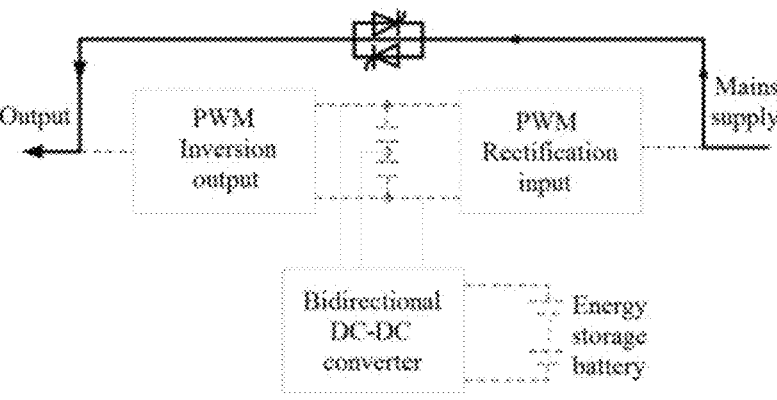
FIG. 2(*a*) to FIG. 2(*d*) are schematic diagrams of four working modes of a high-power UPS, where FIG. 2(*a*) shows a bypass power supply mode.
Figure 2B:
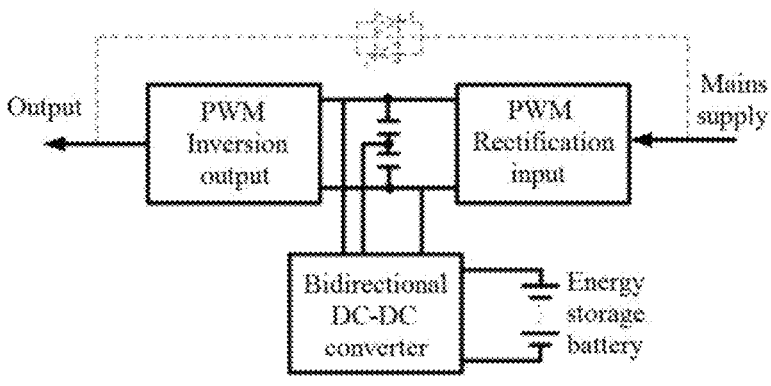
Figure 2C:
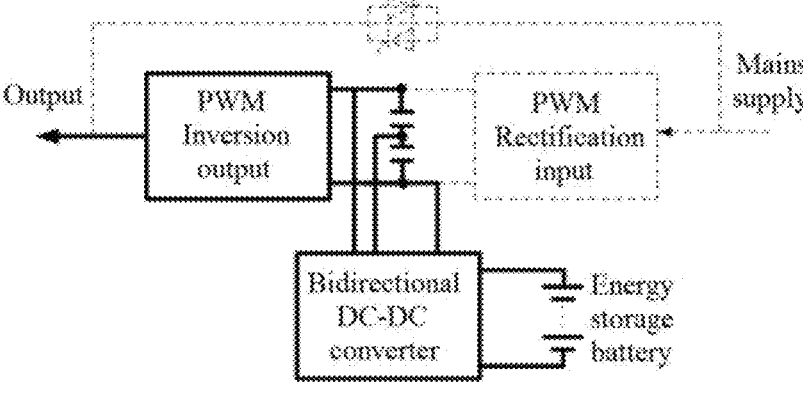
Figure 2D:
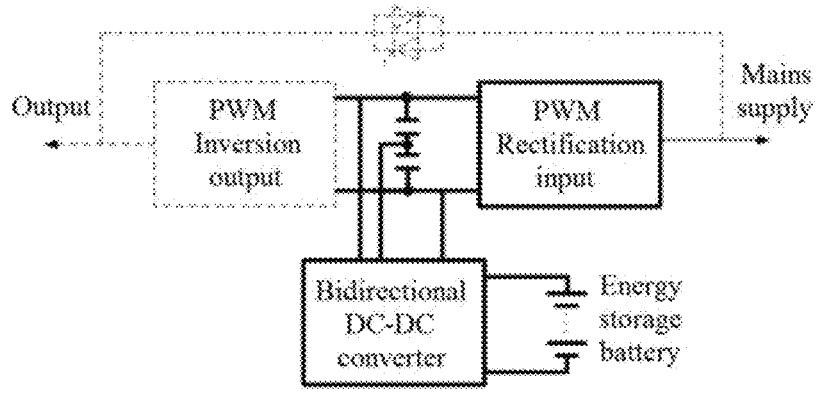
Figure 3A:
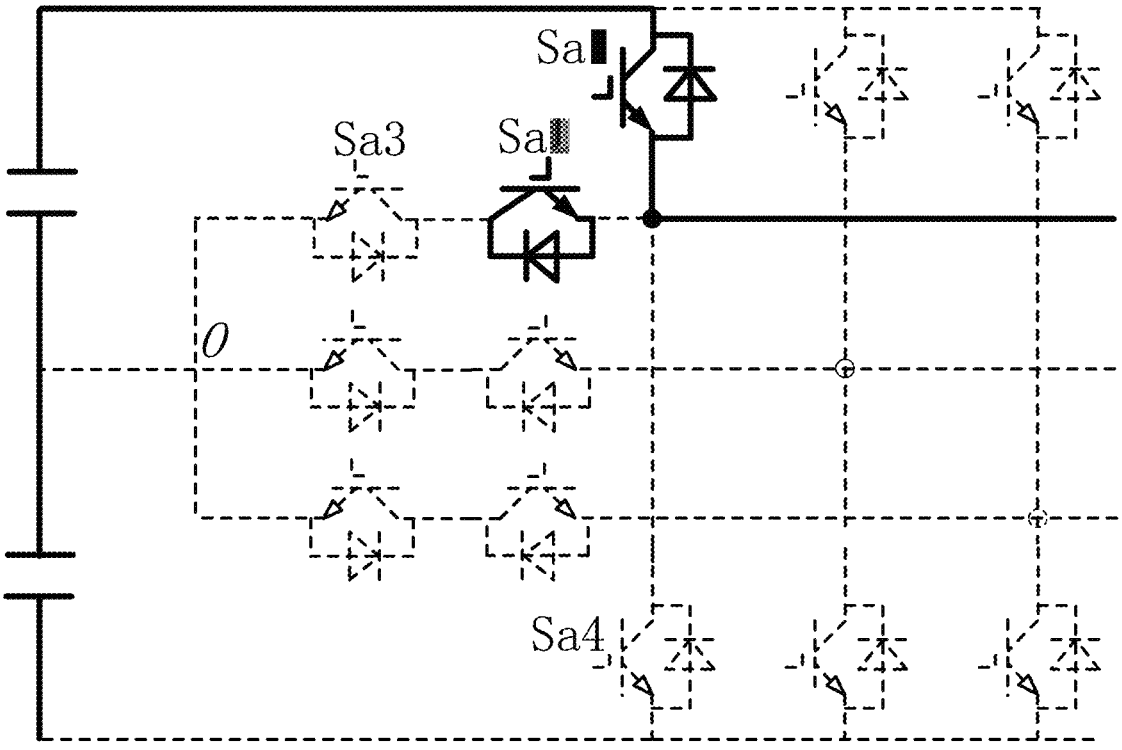
FIG. 3(*a*) to FIG. 3(*c*) are schematic diagrams of an A-phase switching mode of a T-type three-level converter of the present invention, where in FIG. 3(*a*), Sa1=1, Sa2=1, and output P.
Figure 3B:
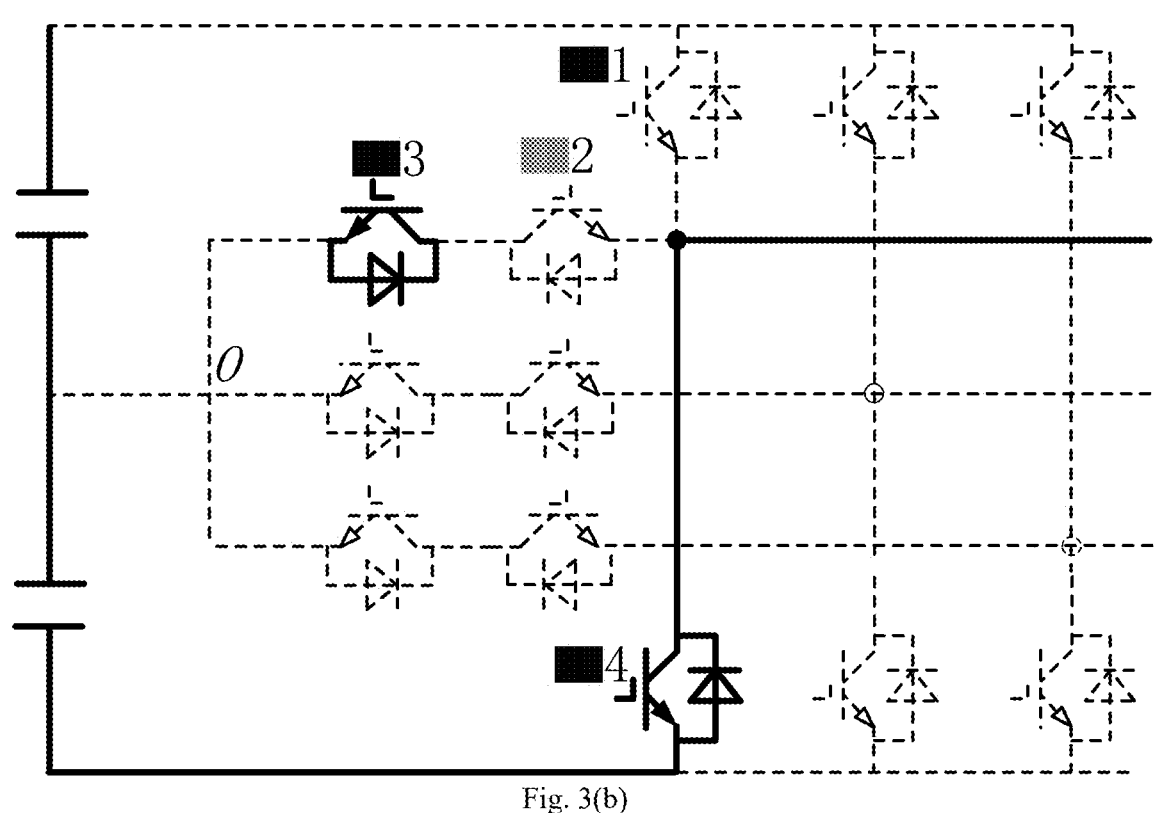
Figure 3C:
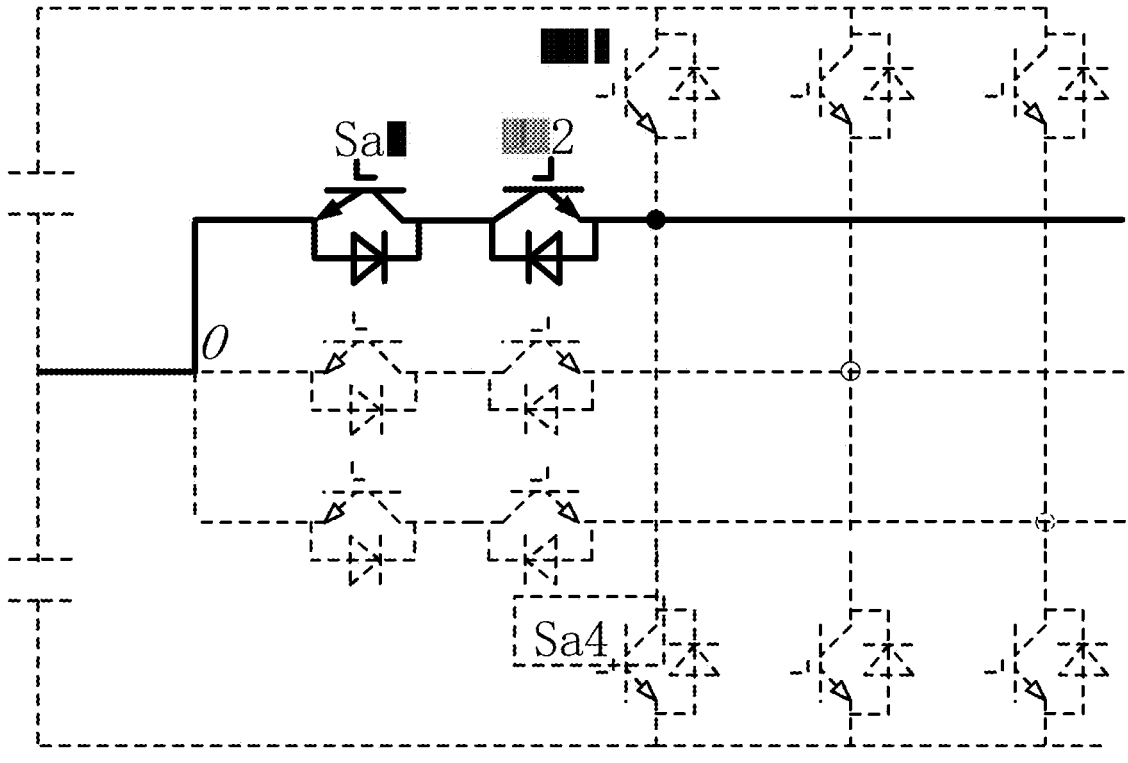

Refer to FIG. 3, which shows a T-type three-level output mode of the present invention. Taking phase A as an example, when Sa1=1 and Sa2=1, T-type three-level output is denoted as P; when Sa3=1 and Sa4=1, T-type three-level output is denoted as N; and when Sa2=1 and Sa3=1, T-type three-level output is denoted as O (where 1 indicates that a switch tube is turned on, and omission indicates that a switch tube is turned off).

Figure 4:
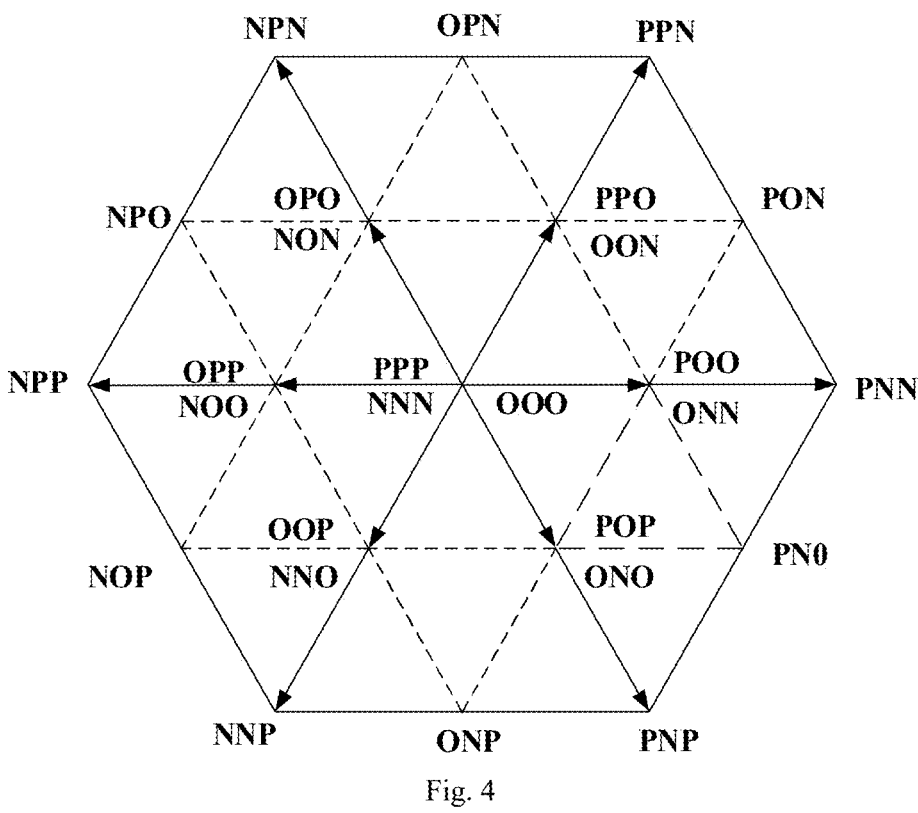
FIG. 4 is a schematic diagram of switch state vectors in a T-type three-level 27 of the present invention.
Figure 5A:
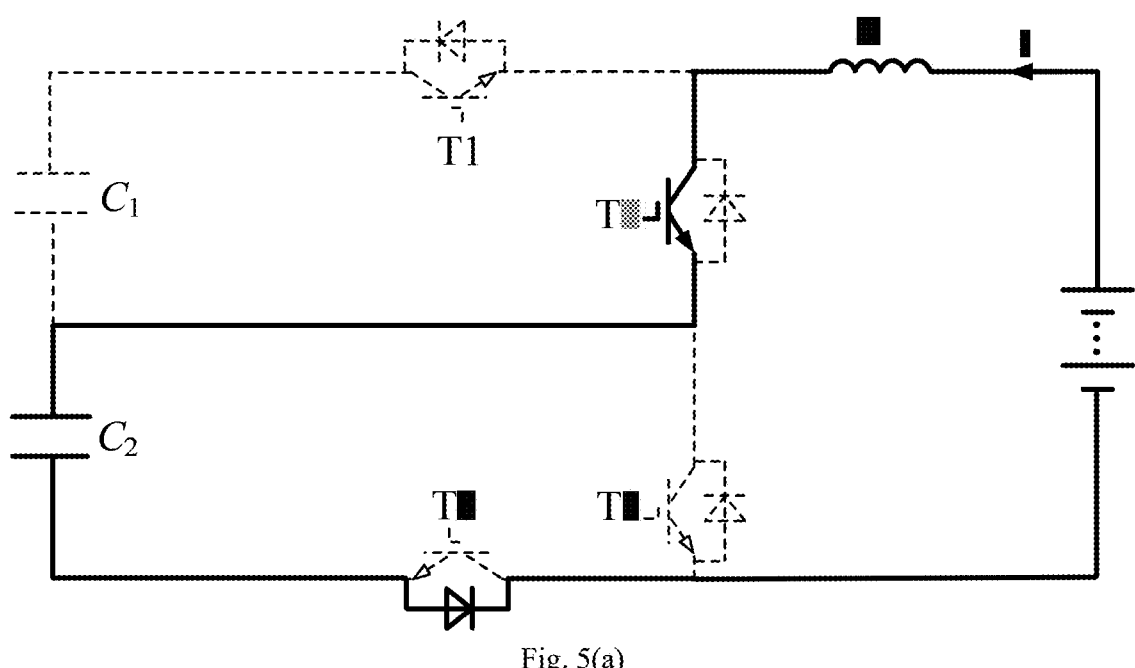
FIG. 5(*a*) to FIG. 5(*h*) are schematic diagrams of eight switching modes of a bidirectional direct current converter of the present invention, where FIG. 5(*a*) shows that a battery feeds electric energy to $C_2$.
Figure 5B:
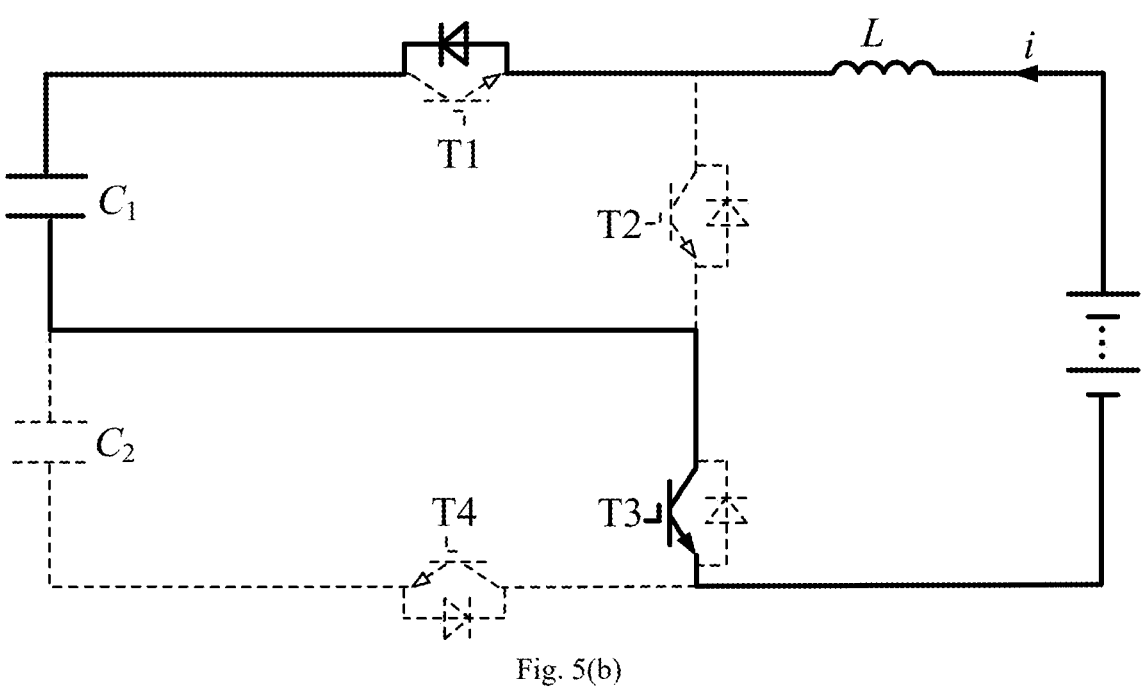
Figure 5C:
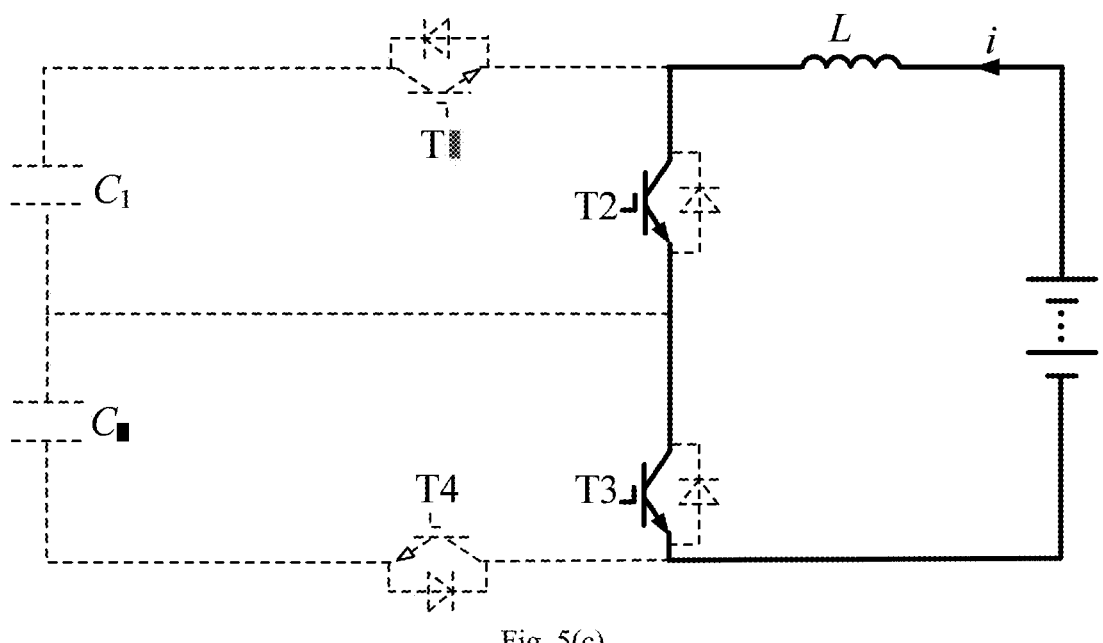
Figure 5D:
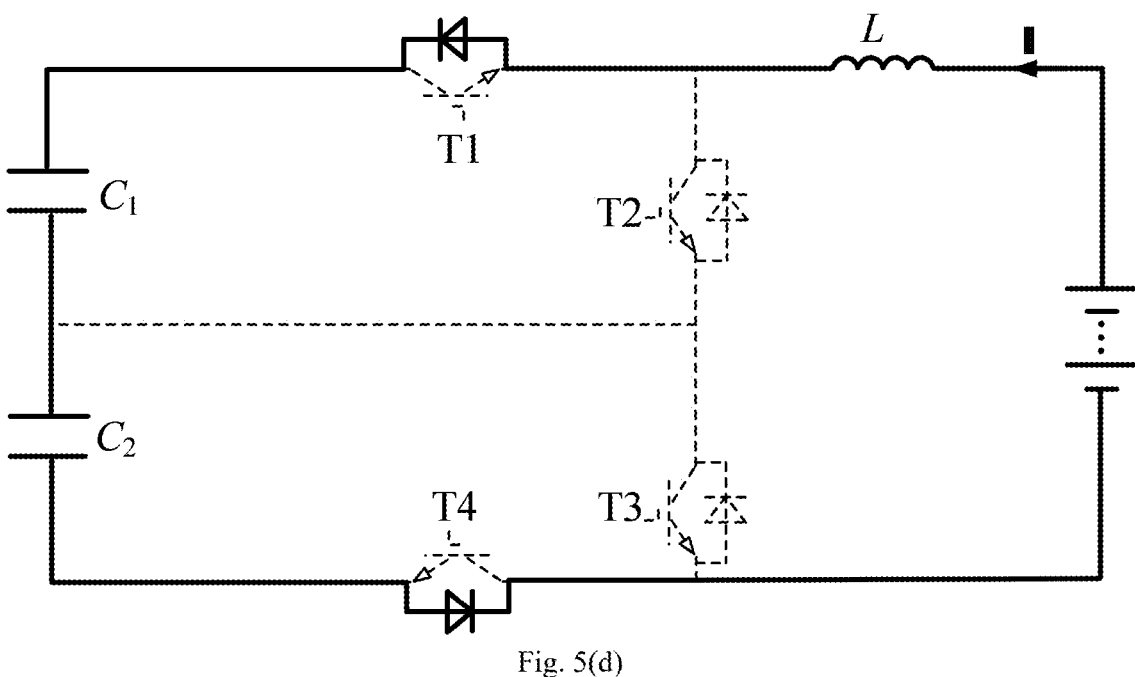
Figure 5E:
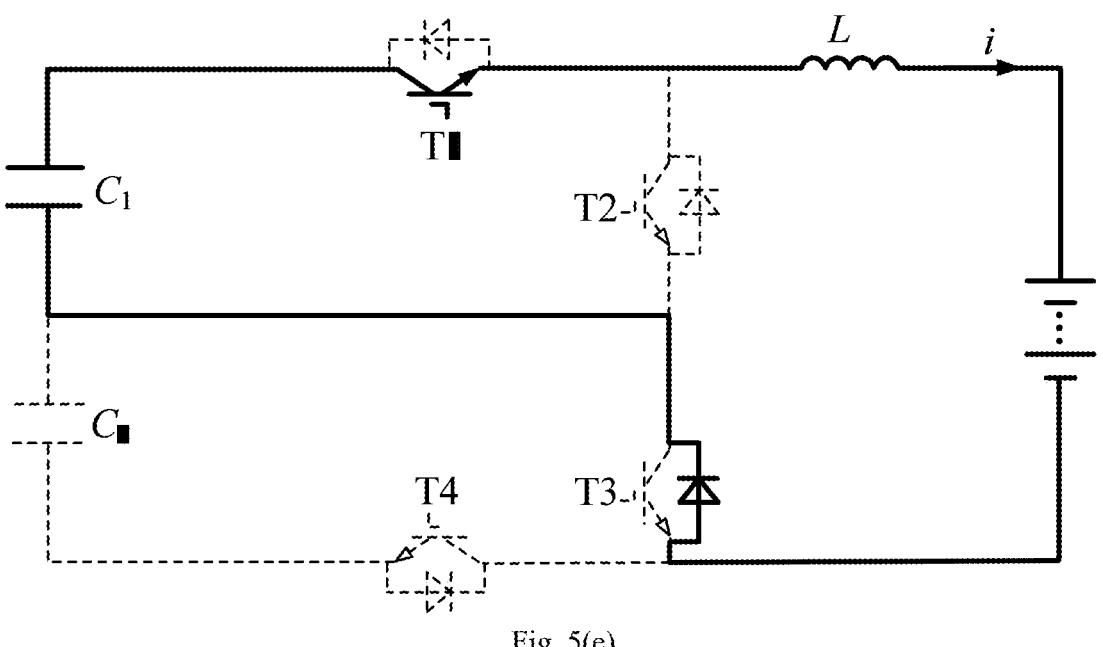
Figure 5F:
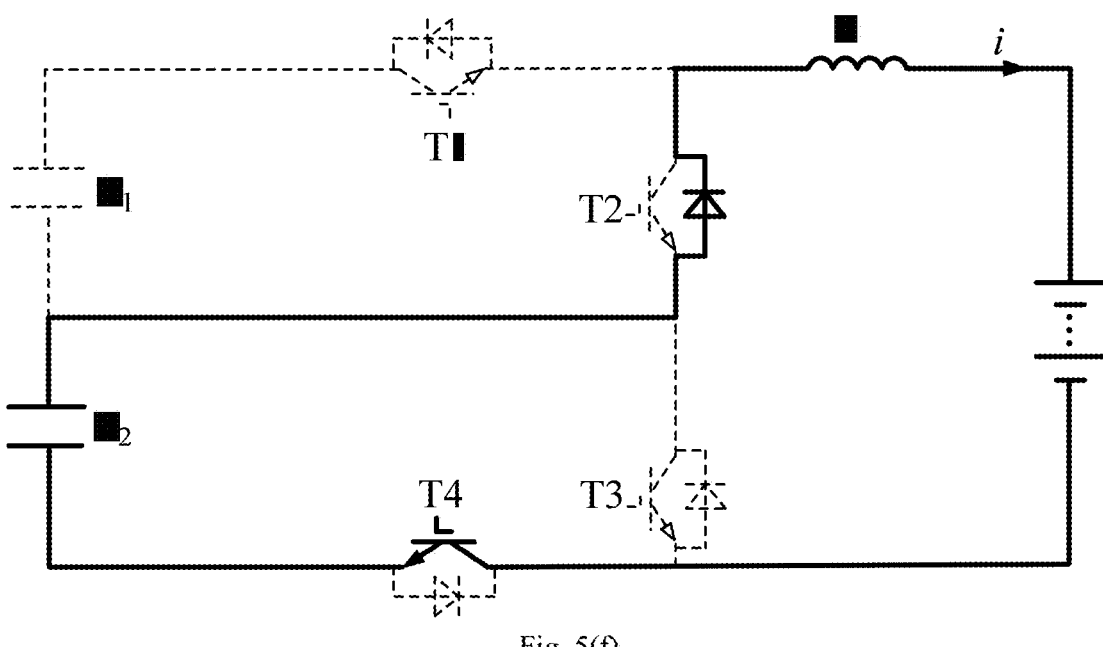
Figure 5G:
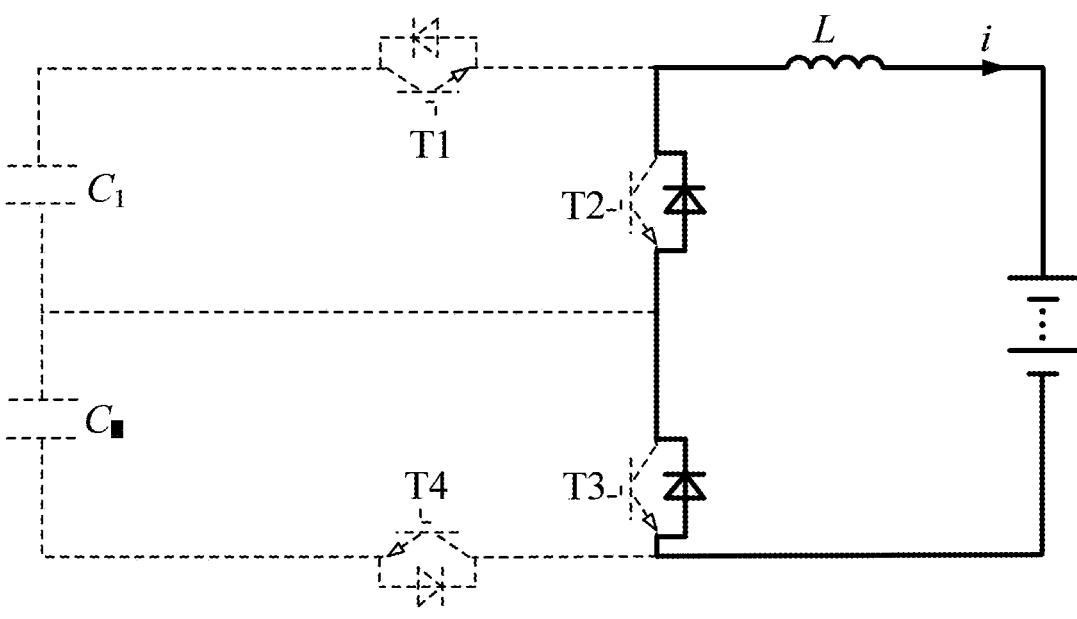
Figure 5H:
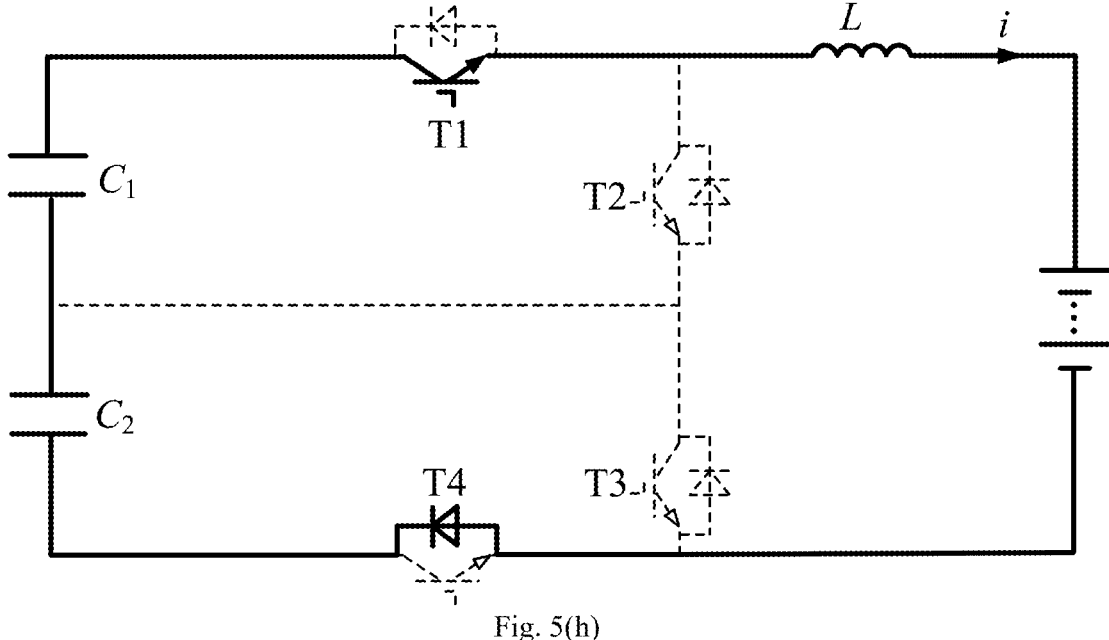

Because a grid is a three-phase system, and each phase has three output modes (P, N, 0), a total of $3^3=27$ possible switching combined vectors (for example, NPN, 0P0, N0N, and the like) may occur in three-phase combinations. FIG. 4 shows a T-type three-level converter. FIG. 5 shows eight possible modes of a bidirectional direct current converter, which are divided into two working modes: charging and energy feeding.

Feed mode: when T2=1, a battery charges a voltage stabilization capacitor $C_2$ on the direct current side; when T3=1, the battery charges a voltage stabilization capacitor $C_1$ on the direct current side; when T2=T3=1, the battery charges an energy storage inductor; and when switch tubes are all switched off, the energy storage battery charges both the voltage stabilization capacitors.

Charging mode: when T1=1, the voltage stabilization capacitor $C_1$ charges the battery; when T4=1, the voltage stabilization capacitor $C_2$ charges the battery; when the switch tubes are all switched off, the battery charges the energy storage inductor; and when T1=T4=1, the voltage stabilization capacitors $C_1$ and $C_2$ jointly supply power to the battery.

A calculation method for an electrical state quantity predicted value of each converter in a UPS system is as follows: through the electrical state quantity prediction calculation, an electrical state quantity at time k+1 may be predicted according to an existing state quantity at time k and in combination with an electrical switch quantity state, and then an optimal switch quantity may be determined according to an optimization function.

In each optimization function calculation formula and electrical state quantity prediction calculation formula of the present invention, dimensions of parameters are not considered.

When the parameters are substituted into calculation, only values of the parameters are considered. A dimension corresponding to a voltage value is V, and a dimension corresponding to a current value is A.

A predicted value $i_g(k+1)$ of alternating current output by a rectifier is as follows:

$$i_g(k+1) = (1 - \frac{R_s T_s}{L_s}) i_g(k) + \frac{T_s}{L_s}[u(k) - u_g(k)];$$

where u(k) is alternating current voltage output by the rectifier, $L_s$ is a value of filter inductance output by the UPS rectifier, $T_s$ is sampling interval time, $R_S$ is resistance of an output line of the system, $i_g(k)$ is grid side current at sampling time k, and $u_g(k)$ is grid voltage at the sampling time k.

A reference value $u_{r\_ref}(k)$ of the alternating current voltage output by the rectifier is as follows:

$$u_{r\_ref}(k) = \frac{L_s}{T_s} i_{rg\_ref}(k) + (R_s - \frac{L_s}{T_s})i_g(k) + u_g(k);$$

where $u_{r\_ref}(k)$ is instruction voltage output by an alternating current side at the sampling time k, and $i_{rg\_ref}(k)$ is an instruction value of grid side current at the sampling time k.

A reference value $u_{i\_ref}(k)$ of alternating current voltage output by an inverter is as follows:

$$u_{i\_ref}(k) = u_n(k);$$

where $u_n(k)$ is a sampling value of rated load voltage at the time k.

A predicted value $u(k+1)$ of the alternating current voltage is calculated as follows:

$$u(k+1) = u(k)e^{j\omega T_s};$$

where $\omega$ is an angular frequency of the system.

A predicted value $U_{cn}(k+1)$ of direct current side voltage stabilization capacitor is as follows:

$$U_{cn}(k+1) = U_{cn}(k) + \frac{T_s}{C_n} i_{Cn}(k);$$

where $U_{cn}(k+1)$ is a capacitor voltage value of $C_n$ (n=1,2) at sampling time k+1, $U_{cn}(k)$ is a capacitor voltage value of $C_n$ (n=1,2) at the sampling time k, and $i_{cn}(k)$ is a value of capacitor current flowing through $C_n$ (n=1,2) at the sampling time k.

A predicted value $i_L(k+1)$ of inductance current in a three-level bidirectional direct current converter is as follows:

$$i_L(k+1) = \frac{T_s}{L}[U_{ES} - (T_1 \| T_3)U_{C1}(k) - (T_2 \| T_4)U_{C2}(k)] + i_L(k);$$

where $U_{ES}$ is voltage of the energy storage battery, L is an inductance value of the three-level bidirectional direct current converter, $T_1$-$T_4$ are output states of a switch tube (1 indicates that the switch tube is closed, and 0 indicates that the switch tube is opened), $U_{c1}(k)$ is a capacitor voltage value of $C_1$ at the sampling time k, and $U_{c2}(k)$ is a capacitor voltage value of $C_2$ at the sampling time k. $i_L(k)$ is an inductance current value of the three-level bidirectional direct current converter at the time k.

Figure 6:
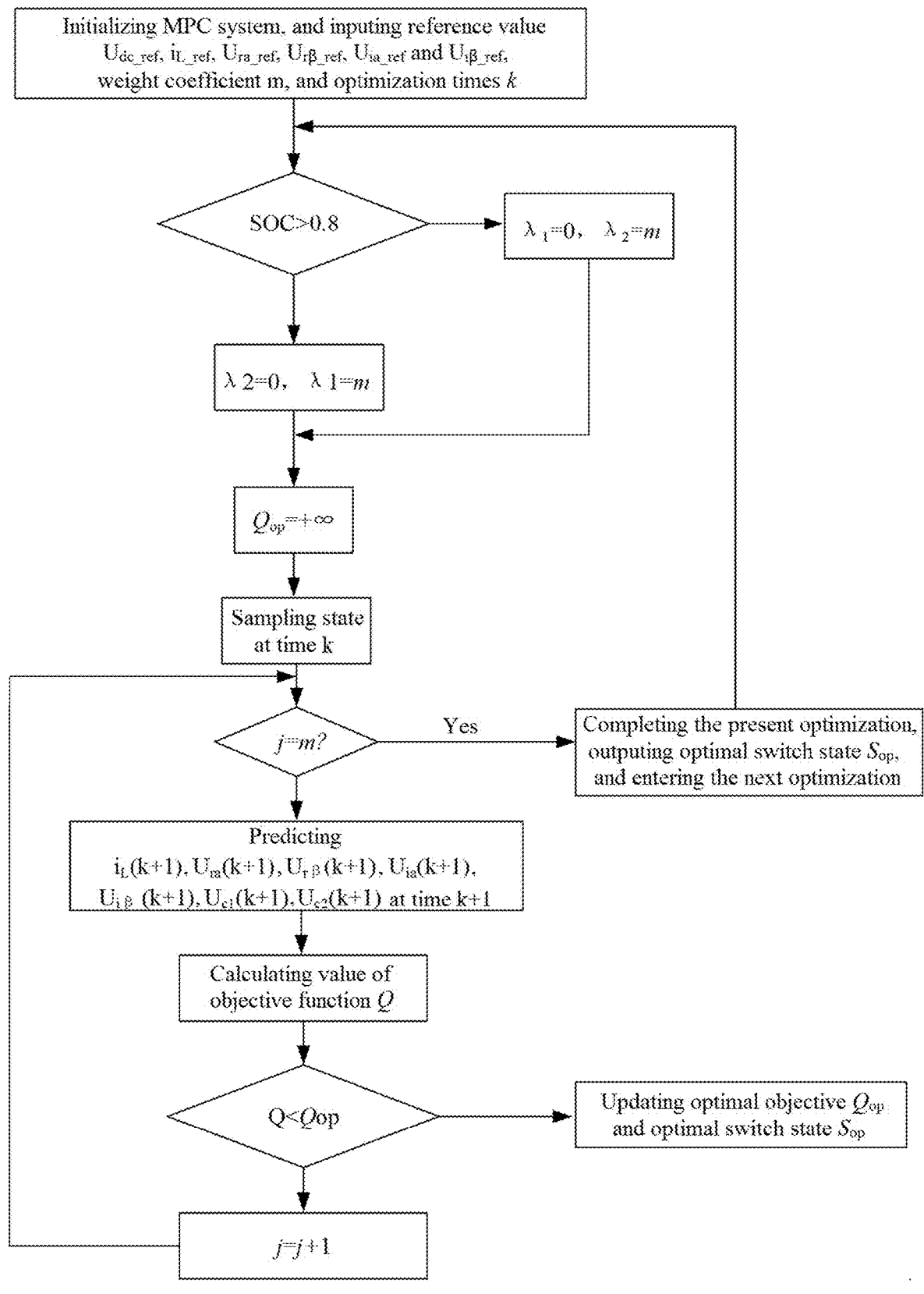
FIG. 6 is a schematic diagram of predictive control of a high-power UPS model of the present invention.

Refer to FIG. 6, which is a coordinated control flowchart of a high-power UPS system based on MPC:

When the UPS works in a UPS power supply mode, an SOC of a battery is first detected.

1) When the SOC of the battery >0.8, a three-level bidirectional direct current converter works in a latched state, and the battery bypasses the system. A load is jointly powered by a rectifier and an inverter, and an optimization function is constructed as follows (the rectifier performs capacitor voltage balance control); if the optimization function Q is minimized, a balance of upper and lower capacitors $C_1$ and $C_2$ on a direct current side can be guaranteed, and control instructions can be accurately tracked.

$$J_1 = |u_{r\alpha\_ref}(k+1) - u_{r\alpha}(k+1)| + |u_{r\beta\_ref}(k+1) - u_{r\beta}(k+1)| + \lambda_1 |U_{c1}(k+1) - U_{c2}(k+1)|;$$

$$J_2 = |u_{i\alpha\_ref}(k+1) - u_{i\alpha}(k+1)| + |u_{i\beta\_ref}(k+1) - u_{i\beta}(k+1)|;$$

$$Q = J_1 + J_2;$$

In the above formulas, $J_1$, $J_2$, and Q are an optimization cost function of the rectifier, a target optimization quantity of the inverter, and a target optimization quantity of the system, respectively. $u_{r\alpha}(k+1)$ is a projection of alternating current voltage output by the rectifier on an $\alpha$-axis at sampling time k+1, and $u_{r\alpha\_ref}$ is a projection of an instruction value of the alternating current voltage output by the rectifier on the $\alpha$-axis. $u_{r\beta}(k+1)$ is a projection of the alternating current voltage output by the rectifier on a $\beta$-axis at the sampling time k+1, and $u_{r\beta\_ref}$ is a projection of the instruction value of the alternating current voltage output by the rectifier on the $\beta$-axis. $U_{c1}(k+1)$ and $U_{c2}(k+1)$ represent direct current voltage of direct current capacitors $C_1$ and $C_2$ at the sampling time k+1 respectively, $u_{i\alpha}(k+1)$ is a projection of alternating current voltage output by the inverter on the $\alpha$-axis at the sampling time k+1, and $u_{i\alpha\_ref}$ is a projection of an instruction value of the alternating current voltage output by the inverter on the $\alpha$-axis. $u_{i\beta}(k+1)$ is a projection of the alternating current voltage output by the inverter on the $\beta$-axis at the sampling time k+1, and $u_{i\beta\_ref}$ is a projection of the instruction value of the alternating current voltage output by the inverter on the $\beta$-axis. $\lambda$ is a weight coefficient, a value of which determines a priority of a controlled variable in global optimization ($\lambda_1$ is a control weight of the rectifier, and $\lambda_2$ is a control weight of the direct current converter).

The $\alpha$-axis and the $\beta$-axis are two coordinate axes of two-phase coordinate axes, and an expression for transforming three-phase alternating current voltage from static coordinate abc axis vectors to two-phase coordinate axes with two axes perpendicular to each other is as follows:

$$\begin{bmatrix} u_\alpha \\ u_\beta \end{bmatrix} = \begin{bmatrix} 1 & -1/2 & -1/2 \\ 0 & \sqrt{3}/2 & -\sqrt{3}/2 \end{bmatrix} \begin{bmatrix} u_a \\ u_b \\ u_c \end{bmatrix}.$$

A controller needs to traverse and optimize on-off states of the rectifier and the inverter $m=(27)^2$ times within a sampling period, and an on-off digital signal S op that forms a minimum cost function Q is selected.

2) When the SOC of the battery <0.8, the three-level bidirectional direct current converter works in a charging mode, and the battery is charged. The rectifier supplies power to the load and the battery, and an optimization function is constructed as follows (the rectifier performs capacitor voltage balance control): if the optimization function Q is minimized, a balance of the upper and lower capacitors $C_1$ and $C_2$ on the direct current side can be guaranteed, while both UPS output instructions and battery output current instructions can be accurately tracked.

$$J_1 = |u_{r\alpha\_ref}(k+1) - u_{r\alpha}(k+1)| + |u_{r\beta\_ref}(k+1) - u_{r\beta}(k+1)| + \lambda_1 |U_{c1}(k+1) - U_{c2}(k+1)|;$$

$$J_2 = |u_{i\alpha\_ref}(k+1) - u_{i\alpha}(k+1)| + |u_{i\beta\_ref}(k+1) - u_{i\beta}(k+1)|;$$

$$J_3=|U_{dc\_ref}-U_{dc}(k+1)|+|i_{L\_ref}-i_L(k+1)|;$$

$$Q=J_1+J_2+J_3;$$

Herein, $i_{L\_ref}$ is an inductance current value of the three-level bidirectional direct current converter. $U_{dc\_ref}$ is an instruction value of direct current side voltage, $U_{dc}(k+1)$ is a value of direct current side capacitor voltage at the time k+1, and the value is calculated by $U_{dc}(k+1)=U_{c1}(k+1)+U_{c2}(k+1)$.

In this case, the three-level bidirectional direct current converter has two working modes: S2=1, and [S2, S3]=1. The controller needs to traverse and optimize on-off states of the rectifier, the inverter and the direct current converter $m=2*(27)^2$ times within a sampling period, and an on-off digital signal S op that forms a minimum cost function Q is selected.

When the UPS works in a battery power supply mode, the SOC of the battery is first detected.

If SOC<0.2, the UPS works in a latched state.

If 0.2<SOC, the battery enters an independent power supply mode, the battery supplies power to the load through the direct current converter and the inverter, and an optimization function is constructed as follows: if the optimization function Q is minimum (a value corresponding to the minimum Q is $Q_{on}$) UPS output instructions can be accurately tracked.

$$J_2=|u_{i\alpha\_ref}(k+1)-u_{i\alpha}(k+1)|+|u_{i\beta\_ref}(k+1)-u_{i\beta}(k+1)|;$$

$$J_4=|U_{dc\_ref}-U_{dc}(k+1)|+|i_{L\_ref}-i_L(k+1)|+|\lambda_2|U_{c1}(k+1)-U_{c2}(k+1)|;$$

$$Q=J_2+J_4.$$

In this case, the three-level bidirectional direct current converter needs to control stability of the direct current side voltage and balance of the capacitors $C_1$ and $C_2$. There are eight working modes of voltage: S1=1, S2=1, S3=1, S4=1, [S1, S4]=1, [S2, S3]=1, and 0 (+, −).

The controller needs to traverse and optimize the on-off states of the inverter and the direct current converter m=8*27 times within a sampling period, and an on-off digital signal $S_{op}$ that forms a minimum cost function Q is selected.

When the UPS works in a battery feed mode, the SOC of the battery is first detected.

If SOC<0.2, the UPS works in a latched state.

If 0.2<SOC, the battery enters an independent power supply mode, the battery feeds electric energy to a grid through the direct current converter and the rectifier (working in an inversion mode), and an optimization function is constructed as follows: if the optimization function Q is minimum, a UPS feed instruction can be accurately tracked.

$$J_1=|u_{r\alpha\_ref}(k+1)-u_{r\alpha}(k+1)|+|u_{r\beta\_ref}(k+1)-u_{r\beta}|;$$

$$J_4=|U_{dc\_ref}-U_{dc}(k+1)|+|i_{L\_ref}-i_L(k+1)|+|\lambda_2|U_{c1}(k+1)-U_{c2}(k+1)|;$$

$$Q=J_2+J_4.$$

In this case, the stability of the direct current side voltage of the three-level bidirectional direct current converter and balance of the capacitors $C_1$ and $C_2$ needs to be controlled. There are eight working modes of voltage: S1=1, S2=1, S3=1, S4=1, [S1, S4]=1, [S2, S3]=1, and 0 (+, −). 0 (+, −) indicates that the output of the converter is 0, + indicates that the battery charges an inductor L in a positive direction to store energy in the inductor L, and − indicates that the battery charges the inductor L in a negative direction to store energy in the inductor L.

The controller needs to traverse and optimize the on-off states of the inverter and the direct current converter m=8*27 times within a sampling period, and an on-off digital signal $Q_{op}$ that forms a minimum cost function Q is selected.

By PSim simulation, effectiveness and progressiveness of the control method provided by the present invention is verified.

Figure 7A:
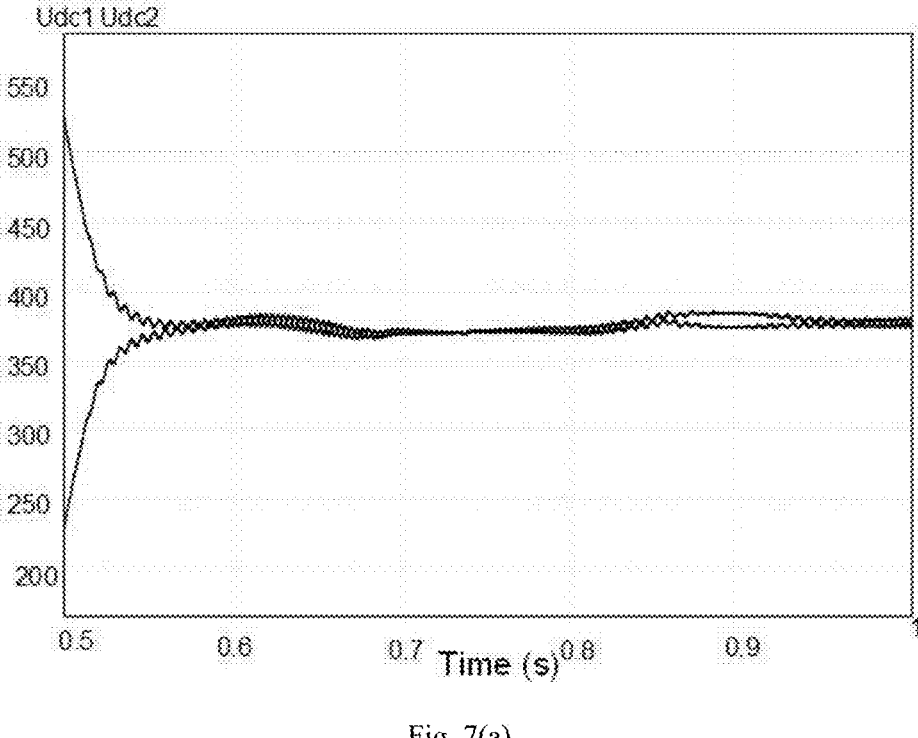
FIG. 7(*a*) to FIG. 7(*d*) are diagrams of UPS simulation results using a control method of the present invention, where FIG. 7(*a*) is a simulation diagram of direct current side capacitors.
Figure 7B:
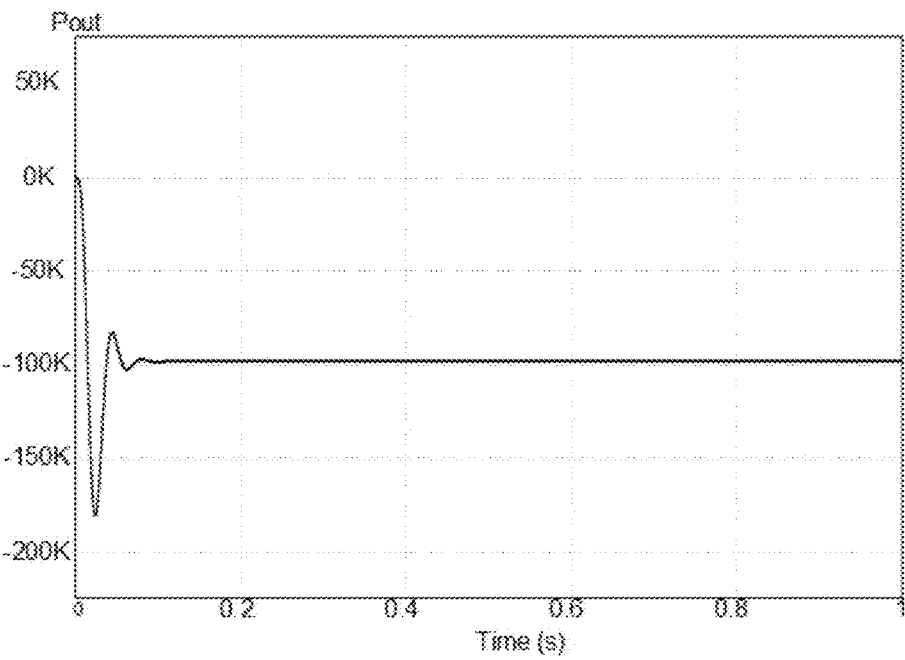
Figure 7C:
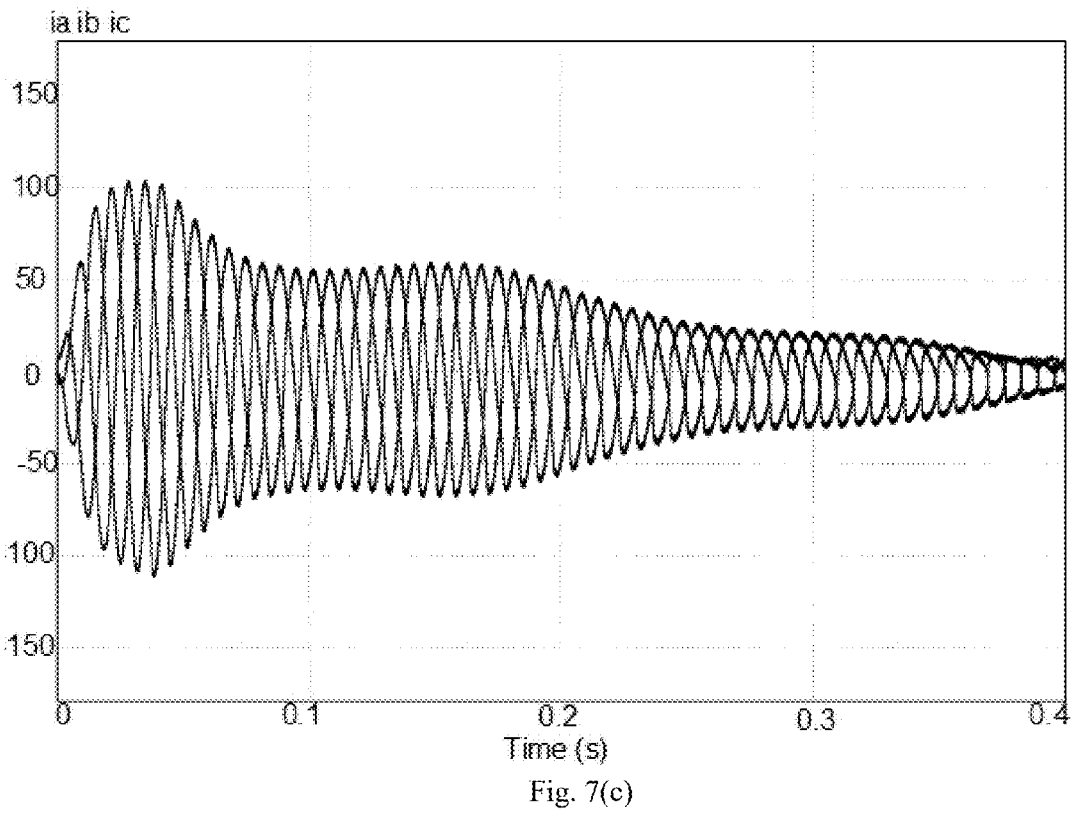
Figure 7D:
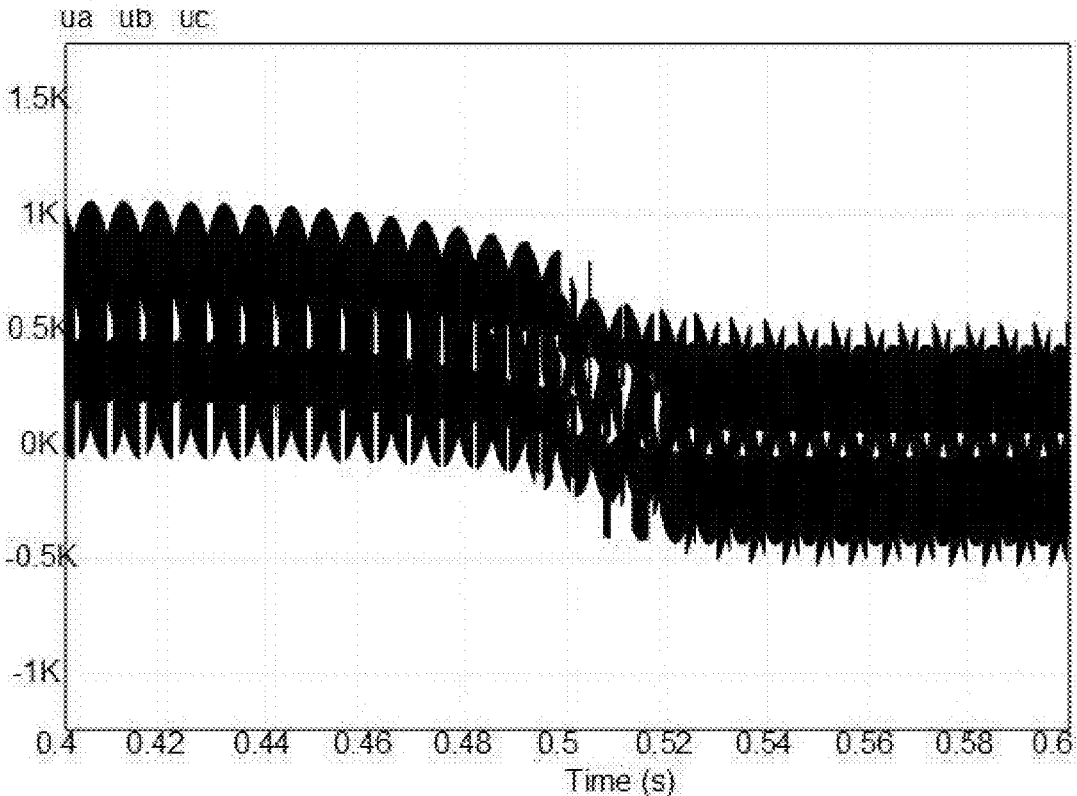

FIG. 7(a), FIG. 7(b), FIG. 7(c), and FIG. 7(d) illustrate UPS simulation using the topology and control method provided by the present invention, with an overall system capacity of 200 KVA, where FIG. 7(a) is a simulation diagram of direct current side capacitors, where udc1 and udc2 represent voltages of three-level upper and lower direct current side capacitors respectively, showing that the system quickly achieves voltage equalization of upper and lower capacitors within 10 ms through voltage balancing control of the present invention; FIG. 7(b) is a system output power instruction diagram, where power instruction output is 100 kw, showing that output power can quickly track an instruction within 20 ms (within a grid cycle) through the system control of the present invention, with an error <1%; and FIG. 7(c) and FIG. 7(d) are current and voltage diagrams of the system during mode switching, showing that when the system switches from a grid connected mode to an island mode, the current and voltage of the system respond quickly and output regulation thereof is completed within 10 ms. Therefore, the device of the present invention responds quickly and can quickly realize a UPS function.

What is claimed is:

1. An electrical state quantity prediction method for an uninterruptible power supply system, comprising: predicting a value $i_g(k+1)$ of alternating current output by a T-type three-level rectifier of the UPS system at sampling time k+1, predicting a value $u_{r\_ref}(k+1)$ of alternating current voltage output by the T-type three-level rectifier of the UPS system at sampling time k+1, predicting a value $u_{i\_ref}(k+1)$ of alternating current voltage output by a T-type three-level inverter of the UPS system at sampling time k+1, predicting a value of $U_{cn}(k+1)$ a voltage stabilization capacitor on a direct current side of the UPS system at sampling time k+1, and predicting a value of $i_L(k+1)$ of inductance current of a three-level three-phase direct current converter of the UPS system at sampling time k+1;

predicting the value $i_g(k+1)$ of alternating current output by the T-type three-level rectifier of the UPS system using:

$$i_g(k+1)=(1-\frac{R_sT_s}{L_s})i_g(k)+\frac{T_s}{L_s}[u(k)-u_g(k)];$$

according to a reference value $u_{r\_ref}(k)$ of alternating current voltage output by the T-type three-level rectifier of the UPS system, predicting the value $u_{r\_ref}(k+1)$ of alternating current voltage output by the T-type three-level rectifier of the UPS system using:

$$u(k+1)=u(k)e^{j\omega T_s};$$

where the calculation formula for the reference value $u_{r\_ref}(k)$ of alternating current voltage output by the T-type three-level rectifier of the UPS system is:

$$u_{r\_ref}(k) = \frac{L_s}{T_s} i_{rg\_ref}(k) + (R_s - \frac{L_s}{T_s}) i_g(k) + u_g(k);$$

according to a reference value $u_{i\_ref}(k)$ of alternating current voltage output by the T-type three-level inverter of the UPS system, predicting the value $u_{i\_ref}(k+1)$ of alternating current voltage output by the T-type three-level inverter of the UPS system using:

$$u(k+1)=u(k)e^{j\omega T_s};$$

where the calculation formula for the reference value $u_{i\_ref}(k)$ of alternating current voltage output by the T-type three-level inverter of the UPS system is:

$$u_{i\_ref}(k)=u_n(k);$$

predicting the value $U_{cn}(k+1)$ of the voltage stabilization capacitor on the direct current side of the UPS system using:

$$U_{cn}(k+1) = U_{cn}(k) + \frac{T_s}{C_n} i_{Cn}(k);$$

predicting the value $i_L(k+1)$ of inductance current of the three-level three-phase direct current converter of the UPS system using:

$$i_L(k+1) = \frac{T_s}{L}[U_{ES} - (T_1\|T_3)U_{C1}(k) - (T_2\|T_4)U_{C2}(k)] + i_L(k);$$

where u(k) is alternating current voltage output by the T-type three-level rectifier/inverter, $L_s$ is a value of filter inductance output by the T-type three-level rectifier, $T_s$ is sampling interval time, $R_s$ is resistance of an output line of the UPS system, $i_g(k)$ is grid side current at sampling time k, and $u_g(k)$ is grid voltage at the sampling time k; $u_{r\_ref}(k)$ is instruction voltage output by an alternating current side of the T-type three-level rectifier at the sampling time k, and $i_{rg\_ref}(k)$ is an instruction value of grid side current at the sampling time k; $u_n(k)$ is a sampling value of rated load voltage at the sampling time k; $\omega$ is an angular frequency of a grid; $U_{cn}(k+1)$ is a voltage value of a direct current side capacitor $C_n$ of the T-type three-level rectifier at sampling time k+1, $U_{cn}(k)$ is a voltage value of $C_n$ at the sampling time k, and $i_{cn}(k)$ is a value of current flowing through $C_n$ at the sampling time k; $U_{ES}$ is voltage of an energy storage battery, L is an inductance value of the three-level three-phase direct current converter of the UPS system, $T_1$-$T_4$ are output states of a switch tube of the three-level three-phase direct current converter, and $i_L(k)$ is an inductance current value of the three-level bidirectional direct current converter at the time k, n=1, 2; and $\|$ represents a logical OR operation.

2. An electrical state quantity prediction system for an uninterruptible power supply system, comprising a processor and a memory, wherein the processor is used to execute a computer program stored in the memory; and the computer program is configured to execute the steps of the electrical state quantity prediction method according to claim 1.

3. A control method for an uninterruptible power supply system, comprising:
   constructing an optimization function;
   selecting an output quantity of each switch tube when the optimization function is minimum, wherein the output quantity 1 represents on of the switch tube, and the output quantity 0 represents off of the switch tube; and controlling on-off of the switch tube of the T-type three-level rectifier, the switch tube of the T-type three-level inverter, and the switch tube of the three-level three-phase direct current converter according to the output quantity of the corresponding switch tube;

when the UPS system works in a UPS power supply mode, if a SOC of a battery $\geq$0.8, the optimization function constructed is $Q=J_1+J_2$;

when the UPS system works in the UPS power supply mode, if the SOC of the battery <0.8, the optimization function constructed is $Q=J_1+J_2+J_3$;

when the UPS system works in a battery power supply mode, or when the UPS system works in a battery feed mode, if the SOC of the battery >0.2, the optimization function constructed is $Q=J_2+J_4$;

wherein, $$J_1=|u_{r\alpha\_ref}(k+1)-u_{r\alpha}(k+1)|+|u_{r\beta\_ref}(k+1)-u_{r\beta}(k+1)|+\lambda_1|U_{c1}(k+1)-U_{c2}(k+1)|;$$

$$J_2=|u_{i\alpha\_ref}(k+1)-u_{i\alpha}(k+1)|+|u_{i\beta\_ref}(k+1)-u_{i\beta}(k+1)|;$$

$$J_3=|U_{dc\_ref}-U_{dc}(k+1)|+|i_{L\_ref}-i_L(k+1)|;$$

$$J_4=|U_{dc\_ref}-U_{dc}(k+1)|+|i_{L\_ref}-i_L(k+1)|+|\lambda_2|U_{c1}(k+1)-U_{c2}(k+1)|;$$

$u_{r\alpha}(k+1)$ is a projection of alternating current voltage $u_r(k+1)$ output by a T-type three-level rectifier on an $\alpha$-axis at sampling time k+1, and $u_{r\alpha\_ref}(k+1)$ is a projection of a reference value $u_{r\_ref}(k+1)$ of the alternating current voltage output by the T-type three-level rectifier on the $\alpha$-axis; $u_{r\beta}(k+1)$ is a projection of the alternating current voltage $u_r(k+1)$ output by the T-type three-level rectifier on a $\beta$-axis at the sampling time k+1, and $u_{r\beta\_ref}(k+1)$ is a projection of the reference value $u_{r\_ref}(k+1)$ of the alternating current voltage output by the T-type three-level rectifier on the $\beta$-axis; $u_{c1}(k+1)$ and $u_{c2}(k+1)$ represent voltage values of direct current side capacitors $C_1$ and $C_2$ of the T-type three-level rectifier at the sampling time k+1 respectively, $u_{i\alpha}(k+1)$ is a projection of alternating current voltage $u_i(k+1)$ output by a T-type three-level inverter on the $\alpha$-axis at the sampling time k+1, $u_{i\alpha\_ref}(k+1)$ is a projection of a reference value $u_{i\_ref}(k+1)$ of the alternating current voltage output by the T-type three-level inverter on the $\alpha$-axis at the sampling time k+1, $u_{i\beta}(k+1)$ is a projection of alternating current voltage $u_i(k+1)$ output by the T-type three-level inverter on the $\beta$-axis at the sampling time k+1, $u_{i\beta\_ref}(k+1)$ is a projection of the reference value $u_{i\_ref}(k+1)$ of the alternating current voltage output by the T-type three-level inverter on the $\beta$-axis, $\lambda_1$ is a control weight of the T-type three-level rectifier, and $\lambda_2$ is a control weight of a three-level three-phase direct current converter; $i_{L\_ref}$ is an inductance current value of the T-type three-level three-phase direct current converter; $U_{dc\_ref}$ is an instruction value of direct current side voltage of the T-type three-level rectifier, and $U_{dc}(k+1)$ is a value of direct current side capacitor voltage at the time k+1; and wherein $u_{r\_ref}(k+1)$ and $u_{i\_ref}(k+1)$ are calculated by the electrical state quantity prediction method according to claim 1.

4. The control method for an uninterruptible power supply system of claim 3, wherein $\lambda_1+\lambda_2=1$.

5. A control system for an uninterruptible power supply system, comprising a processor and a memory, wherein the processor is used to execute a computer program stored in the memory; and the computer program is configured to execute the steps of the control method according to claim 3.

6. A control system for an uninterruptible power supply system, comprising a processor and a memory, wherein the processor is used to execute a computer program stored in the memory; and the computer program is configured to execute the steps of the control method according to claim 4.

7. A control method for an uninterruptible power supply system, comprising:

constructing an optimization function;

selecting an output quantity of each switch tube when the optimization function is minimum, wherein the output quantity 1 represents on of the switch tube, and the output quantity 0 represents off of the switch tube; and controlling on-off of the switch tube of the T-type three-level rectifier, the switch tube of the T-type three-level inverter, and the switch tube of the three-level three-phase direct current converter according to the output quantity of the corresponding switch tube;

when the UPS system works in a UPS power supply mode, if a SOC of a battery $\geq 0.8$, the optimization function constructed is $Q = J_1 + J_2$;

when the UPS system works in the UPS power supply mode, if the SOC of the battery $< 0.8$, the optimization function constructed is $Q = J_1 + J_2 + J_3$;

when the UPS system works in a battery power supply mode, or when the UPS system works in a battery feed mode, if the SOC of the battery $> 0.2$, the optimization function constructed is $Q = J_2 + J_4$;

wherein, $$J_1 = |u_{r\alpha\_ref}(k+1) - u_{r\alpha}(k+1)| + |u_{r\beta\_ref}(k+1) - u_{r\beta}(k+1)| + \lambda_1 |U_{c1}(k+1) - U_{c2}(k+1)|;$$

$$J_2 = |u_{i\alpha\_ref}(k+1) - u_{i\alpha}(k+1)| + |u_{i\beta\_ref}(k+1) - u_{i\beta}(k+1)|;$$

$$J_3 = |U_{dc\_ref} - U_{dc}(k+1)| + |i_{L\_ref} - i_L(k+1)|;$$

$$J_4 = |U_{dc\_ref} - U_{dc}(k+1)| + |i_{L\_ref} - i_L(k+1)| + |\lambda_2| U_{c1}(k+1) - U_{c2}(k+1)|;$$

$u_{r\alpha}(k+1)$ is a projection of alternating current voltage $u_r(k+1)$ output by a T-type three-level rectifier on an $\alpha$-axis at sampling time k+1, and $u_{r\alpha\_ref}(k+1)$ is a projection of a reference value $u_{r\_ref}(k+1)$ of the alternating current voltage output by the T-type three-level rectifier on the $\alpha$-axis; $u_{r\beta}(k+1)$ is a projection of the alternating current voltage $u_r(k+1)$ output by the T-type three-level rectifier on a $\beta$-axis at the sampling time k+1, and $u_{r\beta\_ref}(k+1)$ is a projection of the reference value $u_{r\_ref}(k+1)$ of the alternating current voltage output by the T-type three-level rectifier on the $\beta$-axis; $u_{c1}(k+1)$ and $u_{c2}(k+1)$ represent voltage values of direct current side capacitors $C_1$ and $C_2$ of the T-type three-level rectifier at the sampling time k+1 respectively, $i_{i\alpha}(k+1)$ is a projection of alternating current voltage $u_i(k+1)$ output by a T-type three-level inverter on the $\alpha$-axis at the sampling time k+1, $u_{i\alpha\_ref}(k+1)$ is a projection of a reference value $u_{i\_ref}(k+1)$ of the alternating current voltage output by the T-type three-level inverter on the $\alpha$-axis at the sampling time k+1, $u_{i\beta}(k+1)$ is a projection of alternating current voltage $u_i(k+1)$ output by the T-type three-level inverter on the $\beta$-axis at the sampling time k+1, $u_{i\beta\_ref}(k+1)$ is a projection of the reference value $u_{i\_ref}(k+1)$ of the alternating current voltage output by the T-type three-level inverter on the $\beta$-axis, $\lambda_1$ is a control weight of the T-type three-level rectifier, and $\lambda_2$ is a control weight of a three-level three-phase direct current converter; $i_{L\_ref}$ is an inductance current value of the T-type three-level three-phase direct current converter; $U_{dc\_ref}$ is an instruction value of direct current side voltage of the T-type three-level rectifier, and $U_{dc}(k+1)$ is a value of direct current side capacitor voltage at the time k+1; and wherein $u_{r\_ref}(k+1)$ and $u_{i\_ref}(k+1)$ are calculated by the electrical state quantity prediction method according to claim 2.

8. The control method for an uninterruptible power supply system of claim 7, wherein $\lambda_1 + \lambda_2 = 1$.

9. A control system for an uninterruptible power supply system, comprising a processor and a memory, wherein the processor is used to execute a computer program stored in the memory; and the computer program is configured to execute the steps of the control method according to claim 7.

10. A control system for an uninterruptible power supply system, comprising a processor and a memory, wherein the processor is used to execute a computer program stored in the memory; and the computer program is configured to execute the steps of the control method according to claim 8.

*    *    *    *    *